United States Patent [19]

Hohmann

[11] Patent Number: 4,641,255

[45] Date of Patent: Feb. 3, 1987

[54] APPARATUS FOR SIMULATION OF VISUAL FIELDS OF VIEW

[75] Inventor: Thomas Hohmann, Hanau, Fed. Rep. of Germany

[73] Assignee: Honeywell GmbH, Offenbach, Fed. Rep. of Germany

[21] Appl. No.: 821,509

[22] Filed: Jan. 21, 1986

Related U.S. Application Data

[63] Continuation of Ser. No. 736,980, May 22, 1985, abandoned, which is a continuation of Ser. No. 443,005, Nov. 19, 1982, abandoned.

[51] Int. Cl.$^4$ ................... G06F 16/626; G09G 1/14
[52] U.S. Cl. ..................... 364/522; 340/729; 340/734; 364/518; 434/20; 434/43; 434/69
[58] Field of Search ................ 364/518-522, 364/575; 340/716, 717, 720, 723, 724, 726, 729, 734; 434/20, 26, 28, 37, 38, 43, 69

[56] References Cited

U.S. PATENT DOCUMENTS

| | | | |
|---|---|---|---|
| 3,614,766 | 6/1969 | Kievit | 340/726 |
| 3,961,324 | 6/1976 | Cousin et al. | 340/717 |
| 4,068,225 | 1/1978 | Lee | 340/717 X |
| 4,116,444 | 9/1978 | Mayer et al. | 364/521 X |
| 4,129,859 | 12/1978 | Iwamura et al. | 340/724 X |
| 4,196,430 | 4/1980 | Denko | 340/726 |
| 4,209,832 | 6/1980 | Gilham et al. | 434/20 X |
| 4,317,114 | 2/1982 | Walker | 340/734 X |
| 4,384,338 | 5/1983 | Bennett | 340/729 X |
| 4,475,161 | 10/1984 | Stock | 340/724 X |

OTHER PUBLICATIONS

IBM Technical Disclosure Bulletin, Oct. 1977 (vol. 20, No. 5); "Device for Creating 3D Video Effect by Parallax"; pp. 2051-2056.

Proc. Soc. Photo-Optical Inst. Eng., Aug. 1978 (vol. 162); "Computrol, A New Approach to Computer Generated Imagery"; pp. 16-25.

Electronics, Nov. 20, 1980 (vol. 53, No. 25), "Video Display Processor Simulates Three Dimensions", pp. 123-126.

*Primary Examiner*—Errol A. Krass
*Assistant Examiner*—Kevin J. Teska
*Attorney, Agent, or Firm*—Roger W. Jensen

[57] ABSTRACT

At a simulation of the visual field of view in the training of a battle situation, a TV-monitor is arranged in the field of view of the optics of a person to be trained. On said monitor a cut-out of a digitally stored background image is displayed. The cut-out to be displayed experiences a contaunous change at an aiming motion. The image cut-out is loaded into a buffer memory and with a changed addressing the information in the buffer memory over-lapping with respect to the old and new cut-out is maintained. Only the new digital image information to be added is loaded from the background memory into the buffer memory at the place where the old image information has to be cancelled. Proper addressing takes care that the new buffer memory contents are displayed in the correct logical sequence.

7 Claims, 11 Drawing Figures

|   |   |   |   |   |   |   |   |   |   |
|---|---|---|---|---|---|---|---|---|---|
|A0|A1|A2|A3|A4|A5|A6|A7|A8|A9|
|B0|B1|B2|B3|B4|B5|B6|B7|B8|B9|
|C0|C1|C2|C3|C4|C5|C6|C7|C8|C9|
|D0|D1|D2|D3|D4|D5|D6|D7|D8|D9|
|E0|E1|E2|E3|E4|E5|E6|E7|E8|E9|
|F0|F1|F2|F3|F4|F5|F6|F7|F8|F9|
|G0|G1|G2|G3|G4|G5|G6|G7|G8|G9|
|H0|H1|H2|H3|H4|H5|H6|H7|H8|H9|
|I0|I1|I2|I3|I4|I5|I6|I7|I8|I9|
|J0|J1|J2|J3|J4|J5|J6|J7|J8|J9|

*Fig. 5*

| PHYSICAL OCCUPANCY OF THE MEMORY | READ-OUT START ADDRESS $(x',y')$ | LOGICAL SEQUENCE ON THE IMAGE MONITOR SCREEN | |
|---|---|---|---|
| A0 A1 A2 A3 A4<br>B0 B1 B2 B3 B4<br>C0 C1 C2 C3 C4<br>D0 D1 D2 D3 D4<br>E0 E1 E2 E3 E4 | 0,0 | A0 A1 A2 A3 A4<br>B0 B1 B2 B3 B4<br>C0 C1 C2 C3 C4<br>D0 D1 D2 D3 D4<br>E0 E1 E2 E3 E4 | *Fig. 6a* |
| F5 F1 F2 F3 F4<br>B5 B1 B2 B3 B4<br>C5 C1 C2 C3 C4<br>D5 D1 D2 D3 D4<br>E5 E1 E2 E3 E4 | 1,1 | B1 B2 B3 B4 B5<br>C1 C2 C3 C4 C5<br>D1 D2 D3 D4 D5<br>E1 E2 E3 E4 E5<br>F1 F2 F3 F4 F5 | *Fig. 6b* |
| F5 F6 F2 F3 F4<br>G5 G6 G2 G3 G4<br>C5 C6 C2 C3 C4<br>D5 D6 D2 D3 D4<br>E5 E6 E2 E3 E4 | 2,2 | C2 C3 C4 C5 C6<br>D2 D3 D4 D5 D6<br>E2 E3 E4 E5 E6<br>F2 F3 F4 F5 F6<br>G2 G3 G4 G5 G6 | *Fig. 6c* |
| F5 F6 F7 F3 F4<br>B5 B6 B7 B3 B4<br>C5 C6 C7 C3 C4<br>D5 D6 D7 D3 D4<br>E5 E6 E7 E3 E4 | 3,1 | B3 B4 B5 B6 B7<br>C3 C4 C5 C6 C7<br>D3 D4 D5 D6 D7<br>E3 E4 E5 E6 E7<br>F3 F4 F5 F6 F7 | *Fig. 6d* |
| A5 A6 A7 A8 A4<br>B5 B6 B7 B8 B4<br>C5 C6 C7 C8 C4<br>D5 D6 D7 D8 D4<br>E5 E6 E7 E8 E4 | 4,0 | A4 A5 A6 A7 A8<br>B4 B5 B6 B7 B8<br>C4 C5 C6 C7 C8<br>D4 D5 D6 D7 D8<br>E4 E5 E6 E7 E8 | *Fig. 6e* |

Fig. 7

APPARATUS FOR SIMULATION OF VISUAL FIELDS OF VIEW

This application is a continuation of application Ser. No. 736,980, filed May 22, 1985, which is a continuation of application Ser. No. 443,005, filed Nov. 19, 1982, both now abandoned.

BACKGROUND OF THE INVENTION

1. Field of the Invention

The present invention relates to a method for simulation of a visual field of view as well as to a device for performing said method.

2. Description of the Prior Art

Such a method and apparatus is used in the training for a battle situation on simulators of military devices as for instance tanks, anti-tank weapons, anti-aircraft weapons etc. The operational elements of these training devices correspond to those of actual devices; however, the function of these devices is totally or partly simulated. A main aspect of such a simulation is the replacement of the optical view of a real environment by a view of an artificial environment which comes as close to the reality as possible. In a tank simulator, for example, a TV-monitor may be arranged in the field of view of the mechanical optics such as a panoramic or aiming periscope of the commander or gunner in order to simulate the visual field of view, whereby the optical view of a real environment is replaced by TV images. When a control handle is actuated by the gunner, different addresses are designated by means of which partial cut-outs from a panorama picture stored in a background memory may be supplied to the TV-monitor. Into those partial cut-outs from the background picture, in a known manner, displays of a target may be cut in. With respect to said art, reference should be made to DE-PS No. 28 03 101 and DE-OS No. 29 19 047. There the background picture is divided into a plurality of individual images with the information of said images being presented directly as well as delayed by the TV fly-back time available. In this manner it is possible to randomly put together a partial image from a plurality of individual images, in which the partial image forms a cut-out from the background image. According to DE-PS No. 28 03 101 the individual images are recorded by a plurality of cameras, whereas according to DE-OS No. 29 19 047 the images are digitally stored. However, with digital storage each individual image must be placed in a physically defined memory area, and the image information must be presented directly as well as delayed for displaying on the monitor.

SUMMARY

It is the object of the present invention to provide an improved method and apparatus for image simulation of the previously mentioned species working with digital image storing of the background. A display of a partial image on a TV-monitor is made possible without a signal delay and a physical division of the memory area which has been necessary until now. With the use of a plurality of monitors and when displaying different partial images on those monitors, access problems do not arise in addressing of the background memory. This and other objects are accomplished by selectively addressing a portion of the background image to define a cut-out image and then changing, in a buffer, only that portion of the cut-out image which is different from the previous cut-out image, storing the new data in the same location of the buffer from which old data deleted, then selectively identifying a start position in the buffer for the next "read" sequence. Further advantageous embodiments of the method as well as of a device for performing the method may be taken from the subclaims.

BRIEF DESCRIPTION OF THE DRAWINGS

With respect to an embodiment shown in the figures of the attached drawing, the invention shall be explained in detail in the light of those drawings, in which.

DETAILED DESCRIPTION

Figure 1:
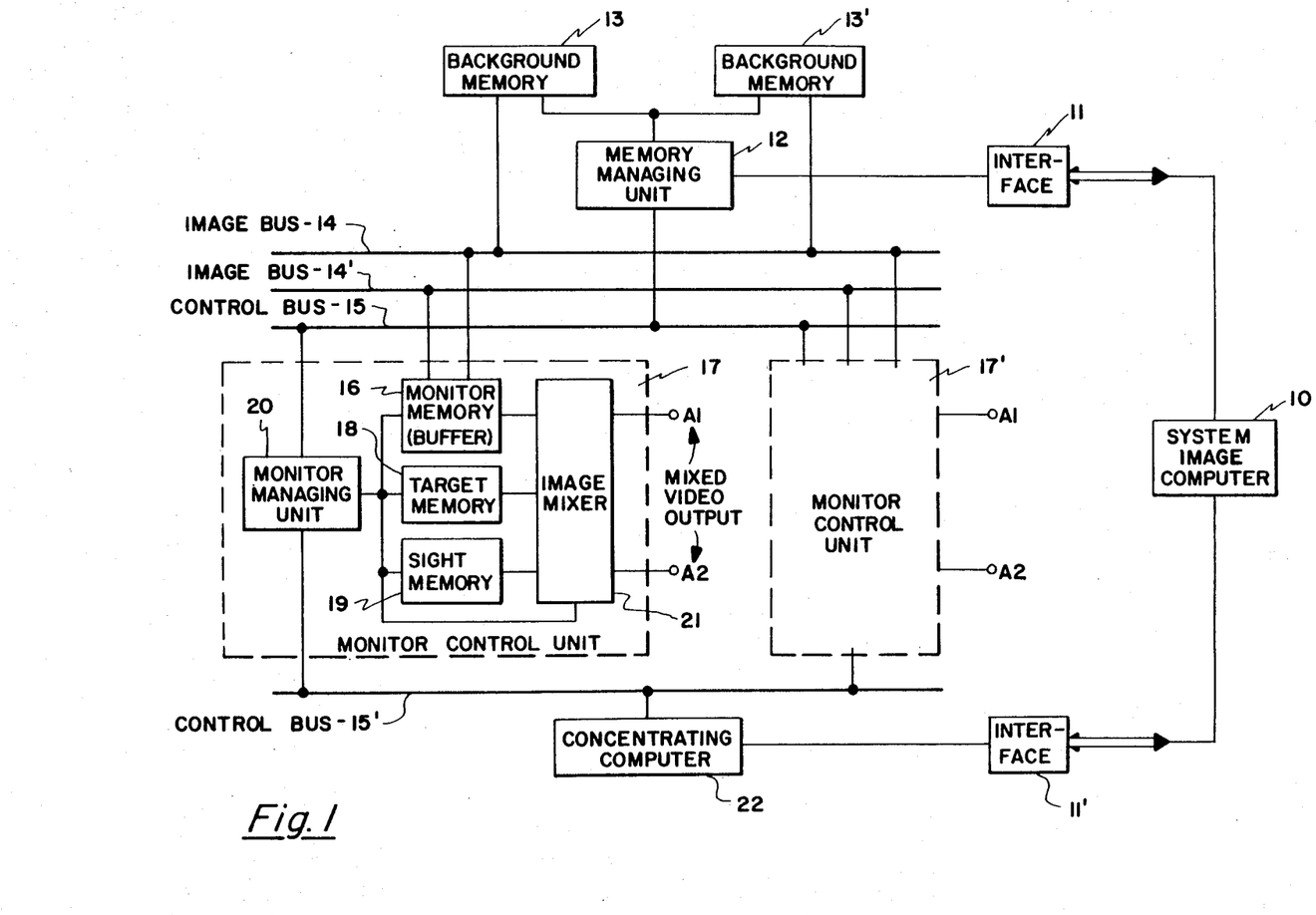
FIG. 1 is a block diagram of a CSI system into which the present invention may be embodied (CSI=computer synthesized imagery)

As shown in FIG. 1, the important parts of a system are shown, into which system the CSI system of the present invention may be incorporated. A system image computer 10 controls the whole system. To said computer, for instance the address signals derived from control handles (not shown) are applied in order to control background memories 13,13', . . . via an interface 11 and a memory managing unit 12 with said memories 13,13', . . . storing the image of a background. Cut-outs from said background image may be selected by means of control handle signals. Further, a panel (not shown) is connected to the system image computer, on which panel certain stored targets may be called up and a course may be provided for said targets.

The background video information digitally stored in the background image memory 13,13' is applied via image busses 14,14' under control of a control bus 15 to a monitor memory 16 acting as a buffer memory. The monitor memory 16 is arranged in a monitor control unit 17 of a first monitor channel. A monitor control unit 17' assigned to a second monitor channel as well as further such units may be arranged according to the number of monitor channels so, at the same time, a plurality of persons may be trained. To each person the same or a different training program may be provided. The monitors, not shown in FIG. 1, are arranged in the field of view of the mechanical optics, i.e., periscope or the like, real or simulated, of a gunner or commander, whereat the screen just covers the field of view of the viewing optics.

Besides the cut-out from the background image stored in the monitor memory 16, an image of the target is stored in a target memory, and an image of a reticle stored in a sight memory 19. This is done by the system image computer 10 which calls up the corresponding information from a mass storage device connected to it. The monitor managing unit 20 controls each memory assignment. Additionally, a concentrating computer 22, which is connected via an interface 11' to the system image computer 10, controls, via a further control bus 15', a hierarchic assignment of the individual monitor managing units 17,17' etc.

After combining the contents of all three memory units 16,18 and 19 in an image mixer 21 as well as after converting the digital image information into an analog video information via separate outputs A1 and A2, respectively, the monitors are controlled which are assigned to the gunner or the commander, respectively. By means of the control handles, the trainee may follow while the reticle a moveable target with the cut-out from the background image experiences a continuous change. The gunner or the commander (trainee), respectively, with his view onto the monitor screen arranged in the field of view of his optics, therefore, has the impression of a battle situation very close to the reality.

With respect to the individual components of the system according to FIG. 1 and their function, the following is to be amplified:

System Image Computer

It is the function of the system image computer 10 to load the individual memories 16,18 and 19 at system initialization and to control the functions of the system in its operation. Said computer evaluates the image cut-outs from the background image due to the aiming data of the simulators connected to the system. Further, said computer transfers the start addresses of these image cut-outs together with the position data for the targets to be displayed, and the control data for the sight memory 19 to the monitor managing units 20 via the concentrating computer 22, this being done within the TV clock period of 40 ms. It is a further function of the system image computer 10 to reload the target memory 18 and/or the sight memory 19 of the individual monitoring channels 17, 17' . . . on demand, whereby independent training programs may be presented at each of the training places connected to the system.

The system image computer 10 further offers the ability to simulate a laser range meter. Since the system image computer knows the virtual position of the targets in the space during the training and since it additionally has the information about the actual direction of the optical axis of each monitoring channel to the background image and since the range related to the image points in the background image is known, it is possible to determine the deviation of the optical axis from the target. By means of the deviation, it may be decided which range indication should be made as a simulated result of a range metering. This means it is to be decided whether the range should relate to the target or to the point in the background on which the optical axis is directed. Therefore, it is necessary that the range information of the average image point contained in the actual cut-out of the background image per TV clock be provided back to the system image computer 10. This back transfer of the range information is achieved by the concentrating computer 22.

Background Image Memory

Figure 3:
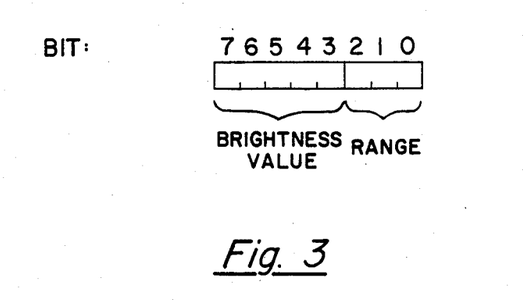
FIG. 3 is a diagram of the word structure of an image point.
Figure 4:
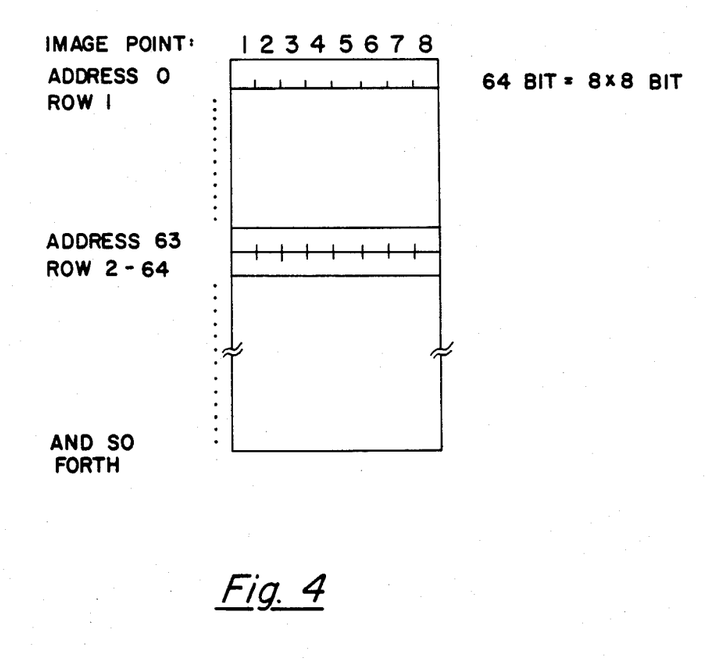
FIG. 4 is a diagram of the organization of the background image memory.

The system shown in FIG. 1 comprises two background image memories 13 and 13', however, it is in principle possible to digitally store a plurality of different background images in a single memory. The digital background images to be stored are provided by making a panorama picture of a landscape and by digitizing subsequently, by means of a scanner, for instance. For the display of an image point, 32 gray levels indicated by a 5 bit representation, are provided. Further, to each image point of said digitized panorama picture, for example, one of eight possible range zones is assigned, requiring 3 additional bits. FIG. 3 shows the digital representation of an individual image point. For storage of the background panorama digitized in this manner eight image points are added to a memory word of 64 bit and are loaded in rows and columns of the background image memory 13,13' as it is shown in FIG. 4. The background image memory 13,13' for instance may be a commercially available computer memory having a word length of 64 bits and a cycle time of ca. 300 ns. The memory capacity depends on the size of the panorama picture to be stored, i.e. on the number of image points.

Monitor Memory

The monitor memory 16 acting as a buffer memory, stores a cut-out from the background image stored in the background image memory 13,13'. The cut-out from the background image in the monitor memory 16, which forms a partial image, is read out with the TV clock. After combining it with the contents of the target memory 18 and the sight memory 19 and after a following digital/analog conversion, it is displayed on the monitor. The monitor memory 16 comprises preferably a resolution of $512 \times 512$ image points. With a change of the viewing direction of the mechanical optics due to a simulated rotation of the turret, the cut-out of the background image residing in the buffer memory must be changed accordingly. This change is achieved in the TV clock interval of 40 ms so that the impression of a continuous image motion arises. Due to time restrictions herewith, it is not possible to load a complete new background image cut-out image clock by image clock from the background image memory 13,13' into the monitor memory 16, since especially at the control of a plurality of monitors with different image contents time is not sufficient for a multiple transfer of 32K memory words in less than 40 ms. For this reason, and in accordance with the present invention, the monitor memory 16 is reloaded via the monitor managing unit 20 in such a way that the image information in the new cut-out overlapping the old cut-out is maintained, and only the newly added digital image information is loaded from the background memory at the position of the image information now being deleted. Later on it shall be explained in detail with respect to FIGS. 5 to 7 how this is done.

Target Memory

For displaying a target, each of the 6 to 8 monitoring channels, i.e. each monitor control unit 17 comprises a target image memory 18 which may contain $2 \times 64$ target images. Each target image preferably has a size of $64 \times 64$ image points, whereat each image point is coded by 4 bits into 16 gray levels. Two different types of targets may be loaded into the target memory 18. Accordingly, 32 target images may be provided for two different magnifications or for a daylight and thermal image representation of the same target. During the training program during each TV clock a data block is transferred from the system image computer 10 which provides the number of both target images to be displayed, two position values (addresses in the background panorama) and the predetermined ranges of the targets. The target images provided in this manner now are read out with the TV clock. This is done in such a way that the individual image points of the target images starting with the specified background image start address and the corresponding image points of the monitor memory 16 are applied at the same time to the image mixer 21.

Sight Memory

The sight memory 19 comprises preferably two semiconductor memories, each of which having a size of $512 \times 512 \times 1$ bit. Both memories are read out in parallel to the monitor memory 16 and to the target memory 18 within the TV clock internal, however, the point of time of the image start of one memory may be delayed by a multiple of the fly-back time. Herewith it is possible to displace the display of the contents of one of the memories on the monitor in vertical direction with respect to the display of the contents of the other memory which allows the simulated adjustment of a vertical lay-off angle in the sight. Accordingly, a horizontal displacement of the contents of the second memory may be provided in order to simulate an indication device faded-in into the sight of which device for instance indicates the angle of the line of sight with respect to the turret.

Image Mixer

In the image mixer 21, the image points to be read out within the TV clock internal from the individual memories 16, 18 and 19 are applied, and they are combined image point by image point in such a manner that the desired display of the partial images on the monitor is provided. The combining of background image points and target image points herewith is done in such a way that a target image point differing from 0 overwrites a background image point if the range related to the target and controlled by the system image computer 10 is less than the range of the corresponding background image point. This allows the total or partial covering of the target as a function of its range by accordingly marked obstacles or landscape formations.

Figure 2:
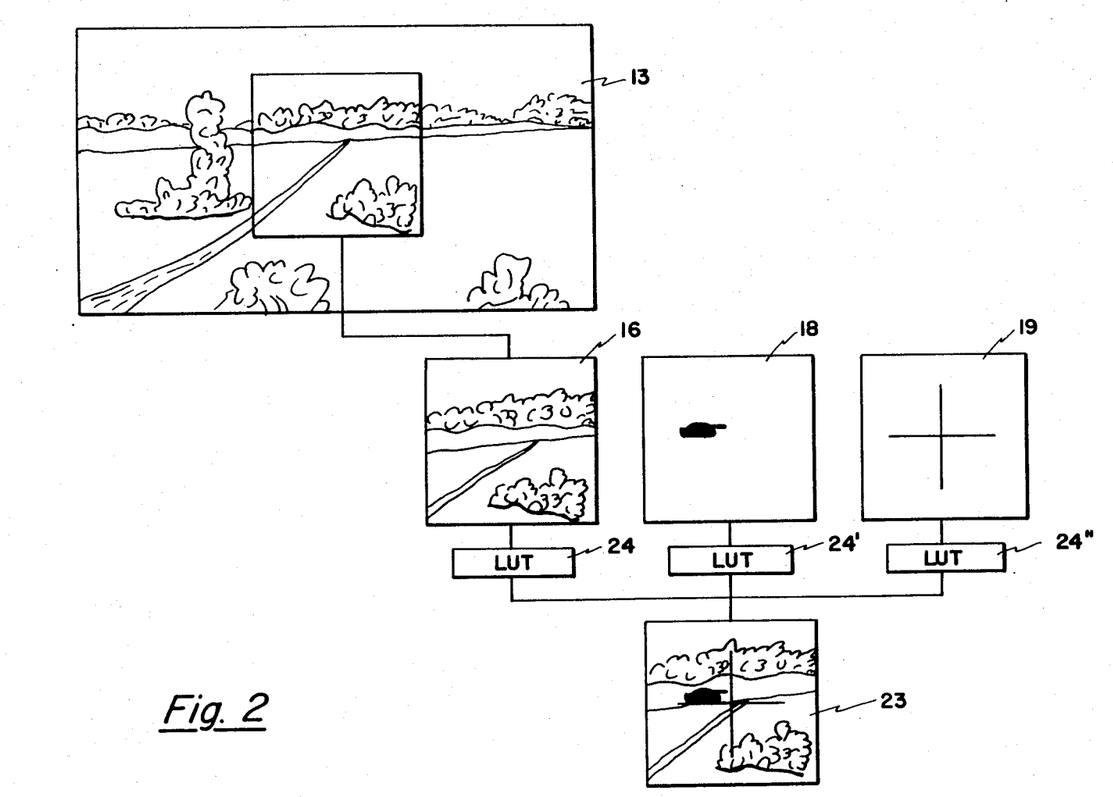
FIG. 2 is a scheme showing the image combination.

To this combined image the corresponding sight image point is added, wherein sight image points differing from 0 are overwriting the image combined from the target and background image. The accordingly mixed image after digital/analog conversion is displayed on a monitor 23 as it is illustratively shown in FIG. 2.

Concentrating Computer, Monitor Managing Unit and Memory Managing Unit

Those three components 12, 20 and 22 are essentially microcomputers which provide the control of the memories and devices connected to them.

It is the function of the concentrating computer 22 to cyclically transfer the control data blocks from the system image computer 10 to the different monitor managing units 20 as well as to concentrate the answer-back signals of said managing units and to transfer them back to the system image computer 10. Furthermore, the concentrating computer controls the transfer of new sight and target image data to individual control units 17, 17' which would be required by the change of the training program with respect to a monitoring channel.

The monitor managing unit 20 evaluates from the background addresses of the actual present monitor image and from the background addresses of the next image transferred by the system image computer 10, the new image area which has to be reloaded from the background memory 13, 13'. Furthermore, it evaluates the new readout start address for the monitor memory 16 and, in coordination with the memory managing unit, it initializes the transfer of the requested memory area via the image buss 14, 14', respectively. In the event where the requested background address for a monitor image lies outside of the limits of the stored background image, the managing unit 20 fills this area with uniform gray values. This allows aiming especially in elevation beyond the stored background image, whereat care is taken that in this region "sky" is displayed. In the event of a change of the training program, the monitor managing unit 20, in cooperation with the concentrating computer 22 and the system image computer 10, is responsible for loading of the target and sight memories 18 and 19 as well as for loading of the look up tables LUT 24, 24' and 24".

It is the function of the memory managing unit 12 to resolve access conflicts to the backgrond memories 13, 13' which arise when a plurality of monitor managing units 20 request background image data at the same time for exchange. The memory managing unit 12 provides the controls for coordinating the sequence of operation of the monitor managing units 20 via the control bus 15. With system initialization, the unit 12 packs the background image data which are provided from the system image computer 10 via the interface 11 into 64 bit words and to load them into the background memory 13, 13'.

Figure 5:
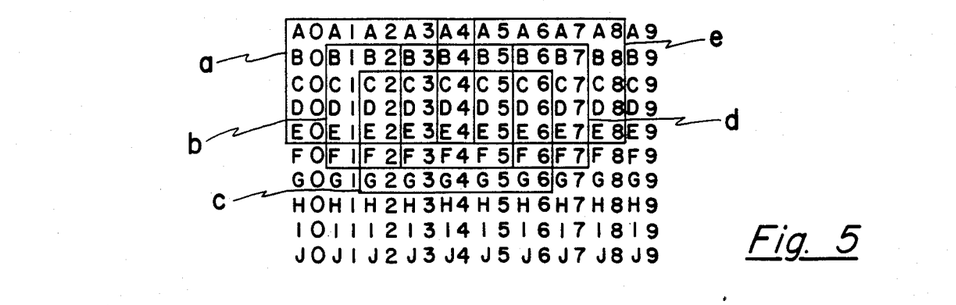
FIG. 5 is a diagram illustrating the contents of the background image memory.

FIG. 5 schematically shows the digital image contents of the background image memory 13. Herewith the display has been illustratively restricted to 10 columns, 0 to 9 and 10 rows A to J. Similarly in FIGS. 6a to 6e the contents of the monitor memory 16 has been illustratively restricted to five columns and five rows. The partial cut-out displayable on the monitor may be taken from a random position in the background image memory by operation of the control handles and a corresponding addressing of the background image memory. This is shown in FIG. 5 by five image cut-outs a to e. FIGS. 6a to 6e then show each of the related physical occupany of the monitor memory 16 as well as the readout start address X', Y' and the logical sequence of the information to be displayed on the monitor screen.

Figure 6A:
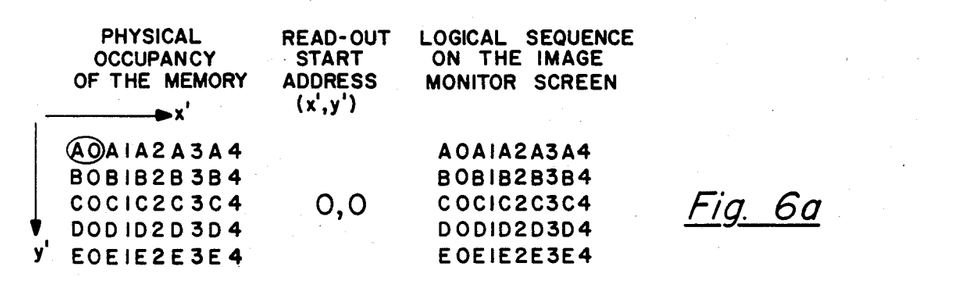
FIGS. 6a to 6e are the schematic representation of contents of the buffer memory during different addressing of the background image memory.

As an initial state it may be assumed that the partial cut-out a to be displayed on the monitor is coincident with the upper left half of the background image. In this event the start address with respect to column and row at the readout is given by the values (0,0) and readout of the information residing in the monitor memory is done by the following addressing: (0,0) . . . (0,4), (1,0), . . . (1,4), . . . (4,0), . . . (4,4).

Figure 6B:
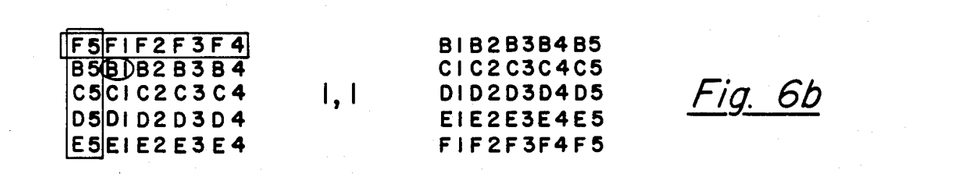
Figure 6C:
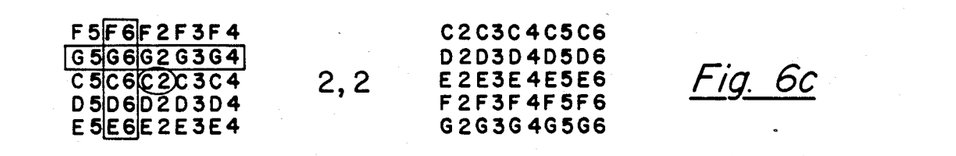
Figure 6D:
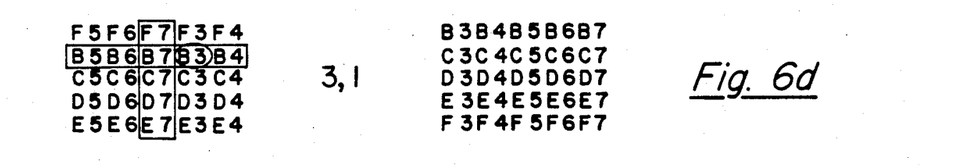
Figure 6E:
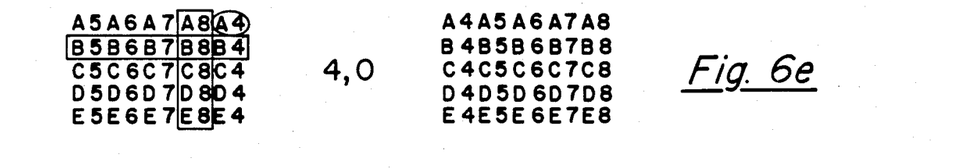

If now a displacement takes place by a column to the right, as illustrated by the cut-out b and a row lower, then so much of the image contents of the cut-out a of the monitor memory 16 as overlaps the image content of the cut-out b are available, and only the image contents from the background image memory which is represented by the rectangular boxes of FIG. 6b is to be reloaded into the monitor memory. Since, however, as shown in FIG. 6b, the new displaced image must start with the left upper corner of the old image a for a proper logical display on the monitor screen, the start address has to be set on the initial word B1 which is marked by a circle. In the present case this means that the column counter as well as the row counter must be preset on the value 1. With a displacement of the cut-out by one column and one row, the following addressing scheme results: (1,1), (1,2), . . . (1,4), (1,0), (2,1), (2,2), . . . (2,0), . . . (4,1), (4,2), . . . (4,0), (0,1), (0,2), . . . (0,4), (0,0).

From the shown scheme it may be noted that with a displacement by one column or one row, respectively, during one TV-image clock interval, only one column or one row, respectively, must be exchanged. At a mere horizontal or vertical displacement, reloading and exchange is reduced to the corresponding columns or rows. Obviously, at a quick aiming movement a plurality of columns and/or rows must be reloaded, but also in this event an important portion of the contents of the monitor memory 16 with respect to the new cut-out will overlap with the cut-out displayed before. In this event where per TV-image clock interval, the cut-out is displaced by a plurality of columns or rows, respectively, obviously the column and row address counters addressing the monitor memory must be preset by the corresponding values.

Figure 7:
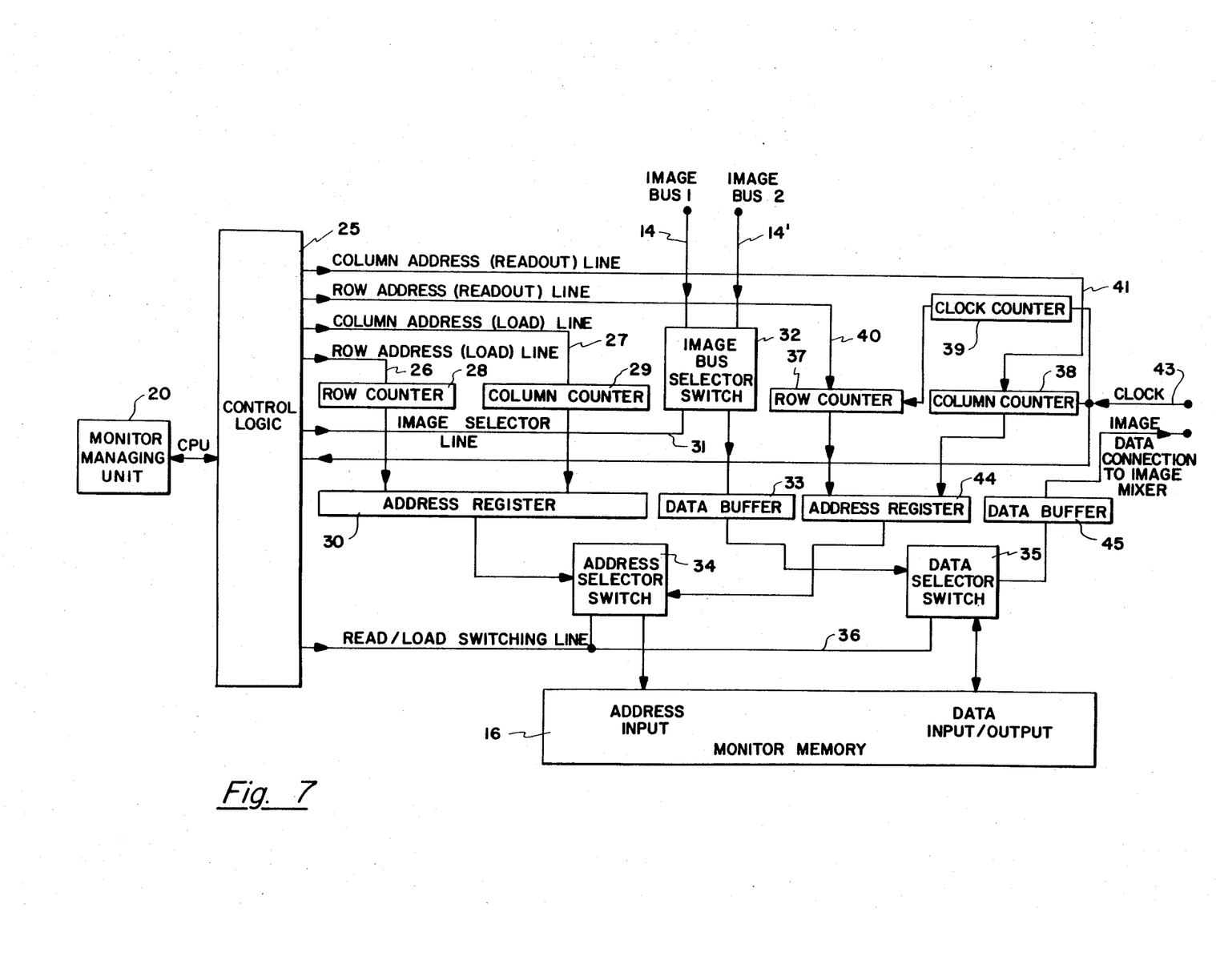
FIG. 7 is a block diagram of an interface between a monitor managing unit and the buffer memory with respect to the addressing of the buffer memory.

FIG. 7 shows a hardware design of an interface between the monitor managing unit 20 and the monitor memory 16 controlling loading and readout of the monitor memory 16 due to signals which it receives from the central processing unit CPU of the monitor managing unit 20. A control logic 25 distributes the signals applied from the central processing unit CPU to the different components of the interface.

At an aiming operation and a correspondingly changed addressing of the background memory 13, the new image information must be transferred to the monitor memory 16. The monitor managing unit 20 knows the addresses under which the new image information is to load in the monitor memory 16. Therefore, it provides via address lines 26 and 27 a first row counter 28 with the row address and a first column counter 29 with the column address. The outputs of both address counters 28 and 29 are applied to a first address register 30 which therefore contains the final address under which each word is to be loaded from the background memory 13 or 13', respectively, into the monitor memory 16. The control logic 25 further controls an image bus selector switch 32 via a selector line 31 for selectively applying the information on the first or second image bus 14 or 14', respectively, to a first data buffer 33 and to load said information into the monitor memory 16 under the address provided by the address register 30. To allow selective loading and readout of data into and from the monitor memory 16, an address selector 34 and a data selector switch 35 are provided, which are actuated by the control logic 25 via the switch line 36 in such a manner that the first address register 30 is connected to the address input and the first data buffer 33 is connected to the data input/output of the monitor memory 16.

The new information loaded in this way into the monitor memory 16, as shown in FIGS. 6a to 6e, physically in the monitor memory 16 does not reside in the area where it has to be displayed on the monitor screen. In order to afford this, in accordance with the present invention, for addressing the information in the monitor memory 16 at readout, two Modulo 511 counters 37 and 38 as well as a 0-511 clock counter are arranged as further row and column address counters. The column address counter 38 and the clock counter 39 are controlled by the TV-clock on a clock line 43. Initially, the row and column address counters 37 and 38 are preset to a predetermined value for the start address via address lines 40 and 41 by the control logic 25. For instance, in the event of FIG. 6d the column address counter 38 and the row address counter 37 are preset on the values 3 and 1, i.e. the start address starts with the fourth column and the second row. The column address counter 38 counts cyclically and attains its preset count after 512 clock pulses. At the same time, the clock counter 39 counts from 0 to 511. After 512 clock pulses, a pulse at the overflow of the counter 39 increments the row address counter 37 by 1 so that, at the next counting process of the column address counter 38, the next row is run through. Also, the row address counter 37 is cyclically run through so that columns and rows which are physically stored in the monitor memory 16 under low addresses at the display on the monitor screen are displayed under a corresponding high address. The address formed by the count of the address counter 37 and 38 is taken from a second address register 44 and is applied via the accordingly actuated address selector switch 34 to the address input of the monitor memory 16. Via the data selector switch 35 being also switched at the readout of the information, the addressed information which is present at the data input/output of the monitor memory 16 is transferred to a second data buffer 45 and is supplied from there to the image mixer.

What is claimed is:

1. In apparatus for simulating a visual field of view for training in a battle situation including means for displaying the image of a background on a TV-monitor in the field of view of an optical system used by a person to be trained, said image of said background being digitally stored, and including changeable addressing means whereby different partial cut-outs from said background image may be selectively displayed on said TV-monitor, the improvement comprising:
 a buffer storage memory;
 means for loading a first partial cut-out from said background image into said buffer memory, said means for loading including means for loading a subsequent partial cut-out from said background having a changed address in such manner that so much of said subsequent partial cut-out as overlaps said initial partial cut-out remains in said buffer memory with only so much of said subsequent partial cut-out as differs from said initial cut-out being loaded into the buffer memory, replacing so much of said first partial cut-out as differs from said subsequent partial cut-out, said loading means including first addressing means for selectively controlling said loading of said buffer memory; and
 readout means for selectively coupling said buffer memory to said TV-monitor, said readout means including modulo (m−1) row address counter (37) and a modulo (n−1) column address counter wherein m and n are numbers representing powers of two.

2. Apparatus as set forth in claim 1 wherein said apparatus includes a monitor managing unit (20) and means coupling said monitor managing unit to said address counters (37, 38) to preset said address counters to a count corresponding to the displacement of the partial cut-out to be displayed on the monitor, said row address counter (37) and said column address counter (38) being operated as ring counters and the contents of the row address counter being increased by one when the column address counter (38) attains its preset count.

3. Apparatus as forth in claim 1 wherein said read-out means includes an address register (44) having inputs connected, respectively, to the outputs of said address counters (37, 38) for addressing, in turn, a momentary image point in the buffer memory (16).

4. Apparatus as set forth in claim 1 wherein said numbers m and n correspond to the value 512.

5. Apparatus as set forth in claim 1 wherein said buffer memory (16) has a storage capacity of m times n image points.

6. Apparatus as set forth in claim 1 wherein said readout means includes a clock input signal and a clock counter (39) having the counting capacity (n) of the column address counter (38) and counting from 0 to n−1, said clock counter having its overflow connected to increment said row address counter (37) by one.

7. Apparatus as set forth in claim 6 wherein said column address counter as well as said clock counter are controlled by the same clock signal.

* * * * *